Nov. 24, 1964
E. I. CROWLEY ETAL  3,158,611
CONVERTING UREA TO MELAMINE IN THE GAS PHASE OVER
A FLUIDIZED BED OF A POROUS
PARTICULATE MATERIAL
Original Filed Dec. 22, 1959
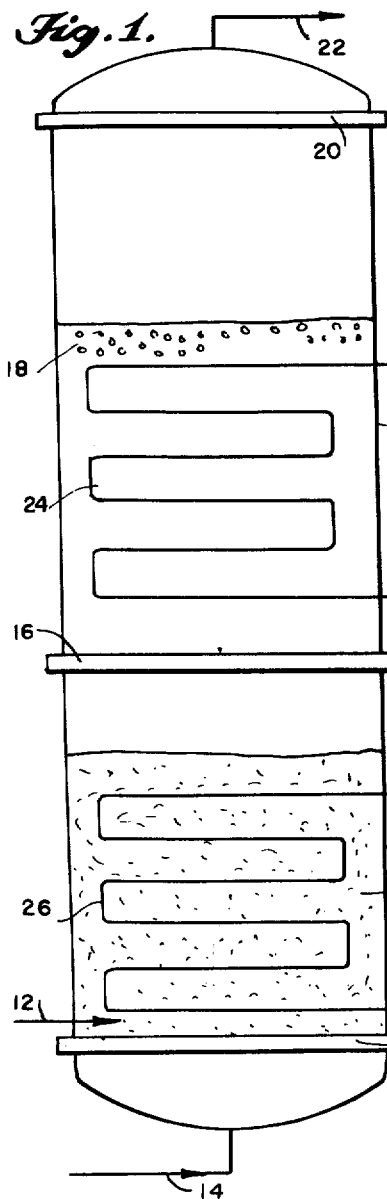
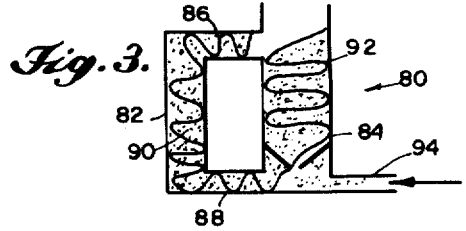
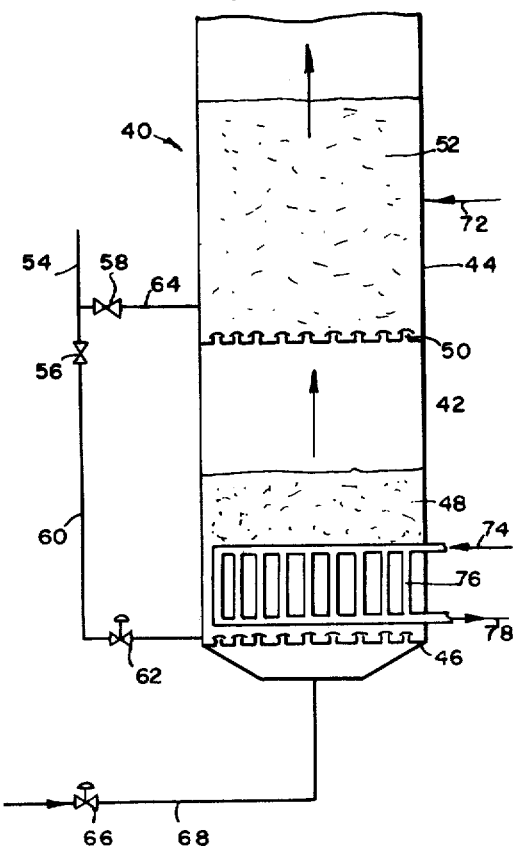
INVENTORS
EDGAR I. CROWLEY
JOHNSTONE S. MACKAY
MILTON MANES
FRANK J. VANCHERI
BY *Cushman, Darby & Cushman*

United States Patent Office 3,158,611
Patented Nov. 24, 1964

3,158,611
CONVERTING UREA TO MELAMINE IN THE GAS PHASE OVER A FLUIDIZED BED OF A POROUS PARTICULATE MATERIAL
Edgar I. Crowley, Minneapolis, Minn., and Johnstone S. Mackay, Milton Manes, and Frank J. Vancheri, Pittsburgh, Pa., assignors to Pittsburgh Chemical Company, Pittsburgh, Pa., a corporation of Pennsylvania
Original application Dec. 22, 1959, Ser. No. 861,272, now Patent No. 3,095,416, dated June 25, 1963. Divided and this application Jan. 15, 1963, Ser. No. 251,663
2 Claims. (Cl. 260—248)

This application is a division of application Serial No. 861,272, filed December 22, 1959, now patent 3,095,416.

This invention relates to the preparation of melamine from urea.

It is an object of the present invention to develop a two stage reaction system for converting urea to melamine.

Another object is to develop a system of converting urea to melamine with improved heat economy.

A further object is to employ heat developed in the exothermic second stage of the reaction of urea to melamine to supply at least part of the heat required in the endothermic first stage of the reaction.

Yet another object is to develop an adiabatic procedure for the second stage in converting urea to melamine in a two stage reactor.

A still further object is to develop an improved procedure for converting urea to melamine employing a fluidized bed of catalyst.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The overall reaction for converting urea to melamine is an endothermic reaction. It has now been observed that this overall reaction is made up of two components. The first component which occurs at a relatively low temperature is an endothermic reaction while the second component which occurs at a higher temperature is exothermic. By appropriately separating these two reactions it is possible to prepare melamine by a more efficient and economical procedure. The requisite conditions are described hereinafter.

In the drawings:
FIGURE 1 shows a two stage reactor employed according to one form of the invention.
FIGURE 2 shows a two stage reactor employed in a second form of the invention.
FIGURE 3 shows a modified apparatus utilizing a transfer line as a preheater.

According to the present invention urea is heated with ammonia gas in a first reactor or preheated at a temperature of 230–300° C., preferably 250 to 280° C. with the optimum being at 260–275° C. The urea and ammonia are passed over a bed of activated alumina or certain other materials set forth hereinafter at a sufficient velocity to fluidize the same. The fluidized bed can be either a fixed fluidized bed or a moving transfer bed. It has been found critical to employ these special materials as the fluidized bed as other materials such as sand or silica gel do not work satisfactorily. Thus, when silica gel is employed as the bed material in the first reactor, there is an undesirable premature build-up of melamine in the first reactor which fouls the bed. It is critical that any solids that might be formed at the temperature employed in the first reactor be insufficient to impair the fluidization.

When sand was tried in the first reactor, there was a continual build-up of cyanuric acid which eventually clogged the system, requiring shut down of the operation to clean the first reactor.

Surprisingly, however, when utilizing activated alumina, activated carbon or Celite (diatomaceous earth), there is no untoward build-up of materials which clog the bed. The bed can be made of any particulate porous material which does not catalyze the decomposition of urea to melamine at the temperature employed, namely, 230–300° C. It was found that the weight pick-up of the activated alumina bed reached an equilibrium when it had adsorbed about 40% of its own weight of reactants. The adsorbate was primarily cyanuric acid.

It was originally believed that temperatures of above 300° C. would be required to completely decompose urea on alumina or the like. It was unexpectedly found, however, that temperatures of the order of 250–260° C. were sufficient. The ability to utilize temperatures below 300° C. permits the use of Dowtherm (a mixture of diphenyl and diphenyl oxide) as the heat transfer medium in the first reactor.

Up until the development of this process, no one had completely gasified urea to anything but melamine.

The vapors from the first reactor are then passed to the second reactor for the formation of melamine. The second reactor is maintained at 350–450° C., preferably within 25° C. of 400° C. The catalyst in the second reactor is not critical and can be activated alumina, silica gel, silica-alumina gel, alumina gel, etc. The preferred catalyst is activated alumina. The catalyst is employed as a fluidized bed.

The entire system in both the first and second reactors is normally at low pressure, e.g., around atmospheric pressure.

In one form of the invention the exothermic heat developed in the second reactor is employed as part of the heat supplied to the first reactor to satisfy the endothermic reaction. Thus, heat transfer salt (a mixture of potassium nitrate, sodium nitrate, potassium nitrite and sodium nitrite melting at 180° C.) is passed in tubes through the second reactor where it receives heat and then it goes through tubes to the first reactor where it supplies heat for the endothermic reaction. Since more heat is required in the first reactor than is supplied by the second reactor, either the heat transfer salt is heated between the second and first reactor or an additional source of heat must be supplied to the first reactor. In either case, however, there is an improved overall heat efficiency by utilizing the heat of the first reactor.

In the second form of the invention heat is supplied to the first reactor by a heat transfer medium, e.g., Dowtherm or heat transfer salt, to gasify the urea. The gases then pass to the second reactor where an adiabatic reaction is maintained by the addition of urea. It has been found that about ⅓ of the urea is added to the second reactor and the rest is added to the first reactor. The heat required to raise the temperature of the vapors issuing from the first reactor at 250° C to 400° C. plus the heat required to gasify the molten urea introduced directly into the second reactor takes care of the exotherm in the second reactor so that the temperature is maintained constant. The molten urea feed to the second reactor can be suitably controlled with the aid of appropriate valves to insure these conditions.

Unless otherwise indicated, all parts and percentages are by weight.

*Example 1*

Referring more specifically to FIGURE 1 there was provided a cylindrical vessel 2 having a first reaction zone or urea gasifier 4 and a second reaction zone or melamine convertor 6. The height above the bubble cap distributor plate 8 in first reaction zone 4 was 16 feet and the inner diameter of the zone was 9.2 feet. Activated alumina 10 (having a mesh size of 50 to 170, U.S. Sieve, with a mean of about 100 mesh) was placed on the plate to a depth (quiescent) of 9.2 feet. Molten urea at 150° C. and a rate of 4000 lbs./hr. and 25 p.s.i.g. was led via line 12 into first reaction zone 4 slightly above plate 8. 4800 lbs./hr of ammonia gas at 25° C. and 25 p.s.i.g. were led through pipe 14 below distributor plate 8 and thence to the urea gasifier 4. The flow of ammonia was sufficient that the expanded or fluidized bed height was 11.5 feet. The gas velocity was 0.475 ft./sec. (minimum gas velocity for fluidization of this bed was 0.119 ft./sec.). The ammonia gas together with the gasified urea then passed through bubble cap distributor plate 16 to melamine convertor 6 having an inner diameter of 9.2 feet. Activated alumina 18 (mesh size 50 to 170) was placed on the plate 16 to a depth (quiescent) of 9.2 feet. The gases coming through the distributor plate 16 caused the expanded or fluidized bed height to be 12.8 feet. The gas velocity was 0.75 ft./sec.

The gaseous reaction products then went through upper bubble cap distribution plate 20 via line 22 to a melamine recovery unit (not shown). Urea vaporizer 4 was maintained at 250° C. and melamine convertor 6 maintained at 400° C.

Heat transfer salt (NaNO$_3$, KNO$_3$, NaNO$_2$ and KNO$_2$) was passed via heat transfer tubes 24 and 26 from melamine convertor 6 to urea gasifier 4. Since the heat picked up from the exothermic reaction in convertor 6 was not sufficient to supply all the requirements of the endothermic reaction in gasifier 4, the heat transfer salt was heated in heater 28 between convertor 6 and gasifier 4. The heat transfer salt emerged from gasifier 4 at 250° C. and then was recycled to convertor 6. The rate of flow of heat transfer salt was such that its drop in temperature from 400 to 250° C. during its passage through gasifier 4 resulted in the loss of about 7,970,000 B.t.u./hr. The yield of melamine on a single pass was as high as 85% of theoretical based on the urea supplied. By recycling the unconverted urea, yields of melamine above 95% are obtained.

*Example 2*

Referring more specifically to FIGURE 2, there was provided a cylindrical vessel 40 having a urea gasifier or first reaction zone 42 and a melamine convertor or second reaction zone 44.

The height above the bubble cap distribution plate 46 in urea gasifier 42 was 16 feet and the inner diameter of the gasifier was 9.2 feet. Activated alumina 48 (mesh size of 50 to 170 with a mean of about 100 mesh) was placed on the plate 46 to a quiescent depth of 9.2 feet. Between urea gasifier 42 and melamine convertor 44 was provided a bubble cap distribution plate 50. The inner diameter of the convertor 44 was 9.2 feet. Activated alumina 52 (50 to 170 mesh size with a mean of about 100 mesh) was placed on plate 50 to a quiescent depth of 9.2 feet. Molten urea at 150° C. was transmitted from a fusion pot (not shown) to line 54 at a rate of 3530 lbs./hr. with the aid of valves 56 and 58 the molten urea was divided into two streams. The major stream of 3336 lbs./hr. was introduced through line 60 and valve 62 at 25 p.s.i.g. and 150° C. to gasifier 42 just above the plate 46. The balance of the molten urea (194 lbs./hr.) was introduced through line 64 also at 25 p.s.i.g. and 150° C. into the convertor 44 slightly above the plate 50.

Ammonia gas at the rate of 4800 lbs./hr. at 25 p.s.i.g. and 25° C. was led via line 68 and control valve 66 below distributor plate 46 and then to the urea gasifier 42. The flow of ammonia was sufficient that the expanded or fluidized bed height was 11.5 feet. The gas velocity was 0.475 ft./sec. (minimum gas velocity required for fluidization of the bed was 0.119 ft./sec.). The ammonia gas together with the gasified urea then passed through bubble cap distributor plate 50 to melamine converter 44. The gases coming through the distributor plate 50 together with the urea gasified after it entered converter 44 from line 64 caused the expanded or fluidized bed height to be 12.8 feet. The gas velocity was 0.75 ft./sec. (minimum fluidization velocity was 0.119 ft./sec.).

The gaseous reaction products then emerged from the top of converter 44 and thence went to a melamine recovery condenser unit (not shown). The urea, biuret and cyanuric acid separated from the melamine in the condenser unit in conventional fashion were then recycled at a temperature of 120° C. via line 72 to the bed 52. Of the 470 lbs./hr. of urea, biuret and cyanuric acid recycled, 416 lbs./hr. was urea, 38.8 lbs./hr. was biuret and 15.3 lbs./hr. was cyanuric acid. The biuret and cyanuric acid were formed as by-products in the decomposition of the urea to melamine.

Urea gasifier 42 was maintained at 250° C. and melamine converter 44 maintained at 400° C.

Dowtherm A (diphenyl-diphenyl oxide) at a rate of 70,000 lbs./hr. and at 338° C. was led via line 74 as a vapor to heat exchange tubes 76 positioned in bed 48 and emerged through line 78 as a liquid to a Dowtherm heater (not shown).

The introduction of 194 lbs./hr. of fresh molten urea and 470 lbs./hr. of recycle urea, biuret and cyanuric acid was just sufficient to take care of the exothermic heat liberated in converter 44 and to maintain the temperature at 400° C. so that converter 44 was operated adiabatically.

The yield of melamine by this continuous process was approximately 95% based on the weight of urea supplied.

FIGURE 3 illustrates an alternative procedure employing a transfer line for preheating the urea and ammonia wherein the best material is in fluid transport. Preheater 80 includes a relatively narrow vertical outer column 82 and a relatively wide vertical inner column 84 connected by an upper horizontal leg 86 and a lower horizontal leg 88. Column 84 has a constriction at the lower end thereof so that the density of the contents of column 82 is less than the density of the contents of column 84. Column 82 and legs 86 and 88 of preheater 80 are filled with granular activated alumina 90. Column 84 is partially filled with the activated alumina. Preheater 80 is heated with the aid of electrical resistance wire 92. A mixture of molten urea and ammonia at 150° C. is introduced through line 94 into preheater 80 at a sufficient velocity to maintain the activated alumina in column 82 in a moving, suspended stream. The cyclic process is maintained as activated alumina constantly falls into column 84 as it is forced out of leg 86 and activated alumina constantly enters leg 88 due to the driving force of the gas stream entering from line 94. The urea and ammonia are heated to a temperature of 275° C. in the preheater 80. The urea is gasified and the gases emerge from the top of preheater 80 to the bottom of a melamine converter maintained at 400° C., e.g., the melamine converter shown in FIGURE 2.

The urea employed as starting material in the present invention can be either liquid or solid. The ammonia can be either liquid or gaseous but should be in the gaseous state when it acts as the fluidizing agent in the urea gasifier and melamine convertor.

Processes of preparing melamine according to the invention are shown in the following examples wherein there was employed a laboratory size two stage reactor. The urea gasifier was a 14½ x 1½ inch diameter column and the melamine converter was a 42½ x 1½ inch diameter column which was fitted on top of the gasifier. Activated alumina was employed as the bed in both the gasifier and the convertor. The activated alumina in the convertor was held in place by a sintered glass plate which also served as a distributor for the effluent vapors from the gasifier. The ammonia gas was introduced into the bottom of the gasifier at a rate of 3.2 l./min. It served to sweep the urea prills into the gasifier and also served as the fluidizing gas for both reactors to convert the activated alumina into fluidized beds.

Example 3

Urea prills were fed continuously at the rate of 90 grams/hr. with the ammonia vapors (3.2 l./min.) into the urea convertor containing the fluid bed of 166.5 grams of activated alumina at 265° C. The effluent vapors were then passed to the melamine convertor having a fluid bed of 427.0 grams of activated alumina maintained at 400° C. The process was continued until 112 grams of urea were fed into the gasifier. 31.5 grams of melamine were recovered (80.2% of theory). Based on recovered urea, the selectivity was 85.0%. By recycling the by-products, the overall yield of melamine was improved to 95%.

Example 4

The process of Example 3 was repeated utilizing a urea gasifier having a temperature of 283° C. and containing 169.5 grams of activated alumina in the fluidized bed. The melamine convertor had a temperature of 400° C. and there were used 412.1 grams of activated alumina in the fluidized bed. Into the urea gasifier there was fed 175 grams of urea prills at the rate of 117 grams/hr. and ammonia gas at the rate of 3.2 l./min. The yield of melamine from the melamine convertor was 46.6 grams or 76.0% of theory. The selectivity for melamine was 80.2%.

Example 5

The urea gasifier had a temperature of 285° C. and there were employed 164.8 grams of activated alumina in the fluidized bed. The melamine convertor had a temperature of 400° C. and there were employed 423.0 grams of activated alumina in the fluidized bed. Into the urea gasifier were fed 150.5 grams of urea prills at the rate of 150.5 grams/hr. and also ammonia gas at 3.2 l./min. The yield of melamine from the melamine convertor was 41.0 grams or 77.7% of theory. The selectivity for melamine was 84.2%.

Example 6

Urea prills (300 g.) were fed continuously with $NH_3$ vapors into a fluidized bed (18.4 g.) of activated carbon (Pittsburgh Coke & Chemical Company type OL) at 270° C. The feed rate was 60 g./hr. and after an initial build-up of solids on the carbon the weight increase remained stationary at 50% of the original weight. There was no melamine on the carbon or in the effluent vapors which were passed into a second reactor in which a fluid bed of activated alumina was maintained at 400° C. A mixture of urea and melamine was recovered overhead. The melamine yield, 84 g., was 80% of theory. Based on recovered urea, 36 g., the selectivity was 91%.

Example 7

Urea prills (210 g.) were fed continuously with $NH_3$ vapors into a fluidized bed of Celite (23.3 g.) at 275° C. The urea was fed at the rate of 35 g./hr. and the stationary holdup on the Celite was 10% of its original weight. There was no melamine on the Celite or in the effluent vapors which were passed into a second fluidized bed in which activated alumina was maintained at 400° C. The condensate from the overhead vapors yielded 60 g. melamine and 23 g. urea. The yield was 82% of theory and the selectivity was 92%.

Example 8

Urea prills were fed with $NH_3$ into a fluidized bed of sand at 250° C. using the rate of feed of Example 6. Maximum feed time before plugging occurred was 3 minutes or 2–3 g. urea. The urea melted on the sand and the sand particles gradually became agglomerated which resulted in sluggish fluidization and eventual plugging.

Example 9

Urea prills were fed with $NH_3$ into a fluidized bed of silica gel at 260° C. utilizing the rate of feed of Example 6. Considerable difficulties were encountered in the run. The bed became sluggish and eventually reached a point where urea feed was limited to 1–2 g. before plugging at the bottom. Traces of melamine were found in the overhead vapors; however, there was a sizeable build-up of melamine on the catalyst. The melamine adsorption on the catalyst reduced considerably the surface area, thus hindering area absorption and causing sluggish fluidization and eventual plugging.

We claim:
1. A process for converting urea to a vapor mixture free of melamine comprising gasifying urea over a fluidized bed of a particulate porous material selected from the group consisting of activated alumina, diatomaceous earth and activated carbon which does not catalyze the decomposition of urea to melamine at the temperature employed, said process being carried out at atmospheric pressure and at a temperature of 230–300° C. and in the presence of ammonia as a fluidizing gas.

2. A process according to claim 1 wherein the particulate porous material is activated alumina.

References Cited in the file of this patent

UNITED STATES PATENTS

| | | |
|---|---|---|
| 2,145,392 | Harmon | Jan. 31, 1939 |
| 2,370,065 | Olin | Feb. 20, 1945 |
| 2,524,049 | Garbo | Oct. 3, 1950 |
| 2,712,491 | Boatright | July 5, 1955 |
| 2,918,467 | Hibbits et al. | Dec. 22, 1959 |
| 3,057,918 | Formaini | Oct. 9, 1962 |
| 3,093,644 | Steggerda | June 11, 1963 |
| 3,095,416 | Crowley et al. | June 25, 1963 |

FOREIGN PATENTS

| | | |
|---|---|---|
| 537,990 | Canada | Mar. 12, 1957 |
| 552,930 | Canada | Feb. 11, 1958 |